Nov. 24, 1959
G. M. BEATTY
2,914,294
GATE VALVE
Filed May 3, 1957
2 Sheets-Sheet 1
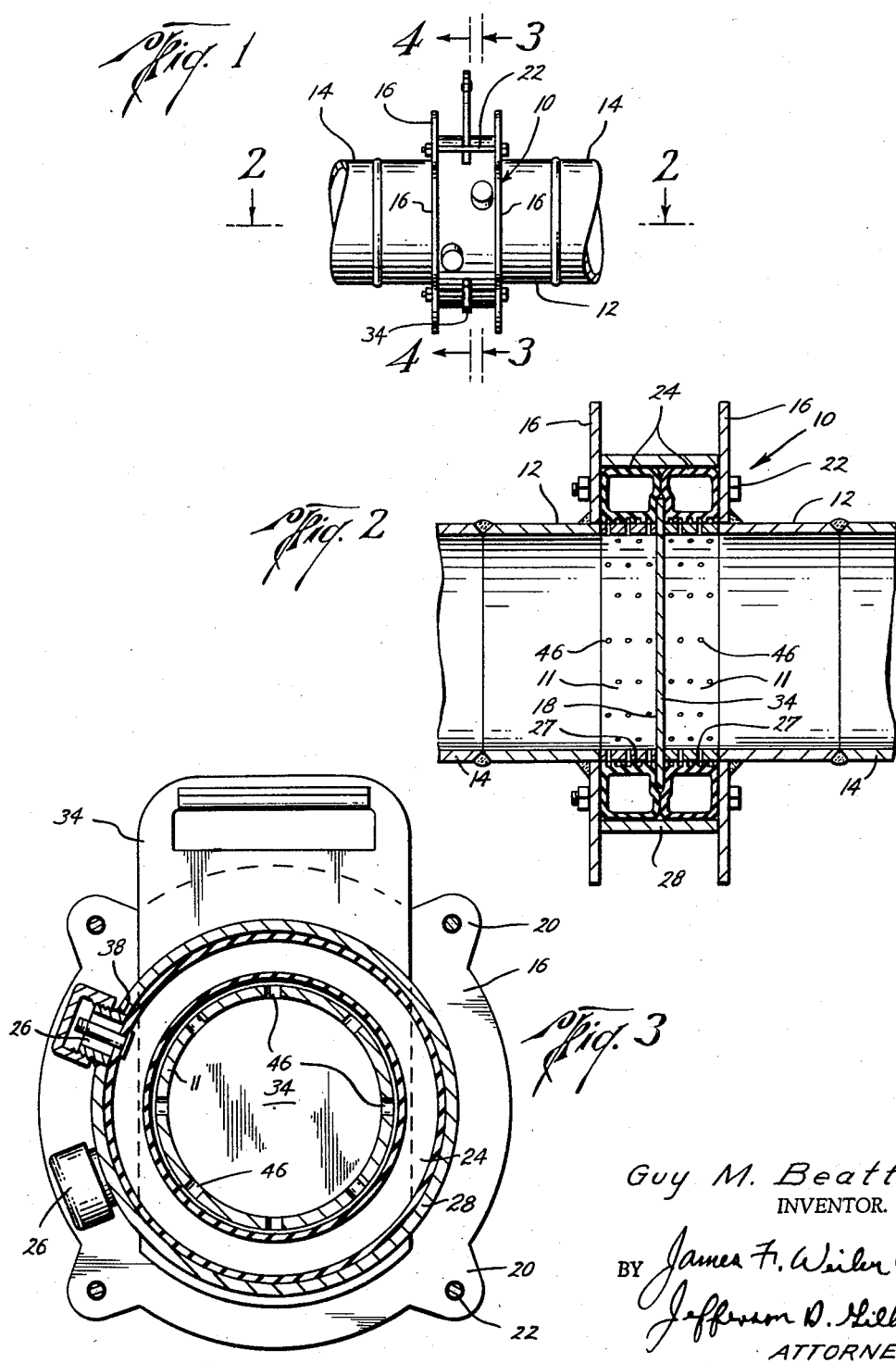
Guy M. Beatty
INVENTOR.
BY James F. Weiler &
Jefferson D. Giller
ATTORNEYS

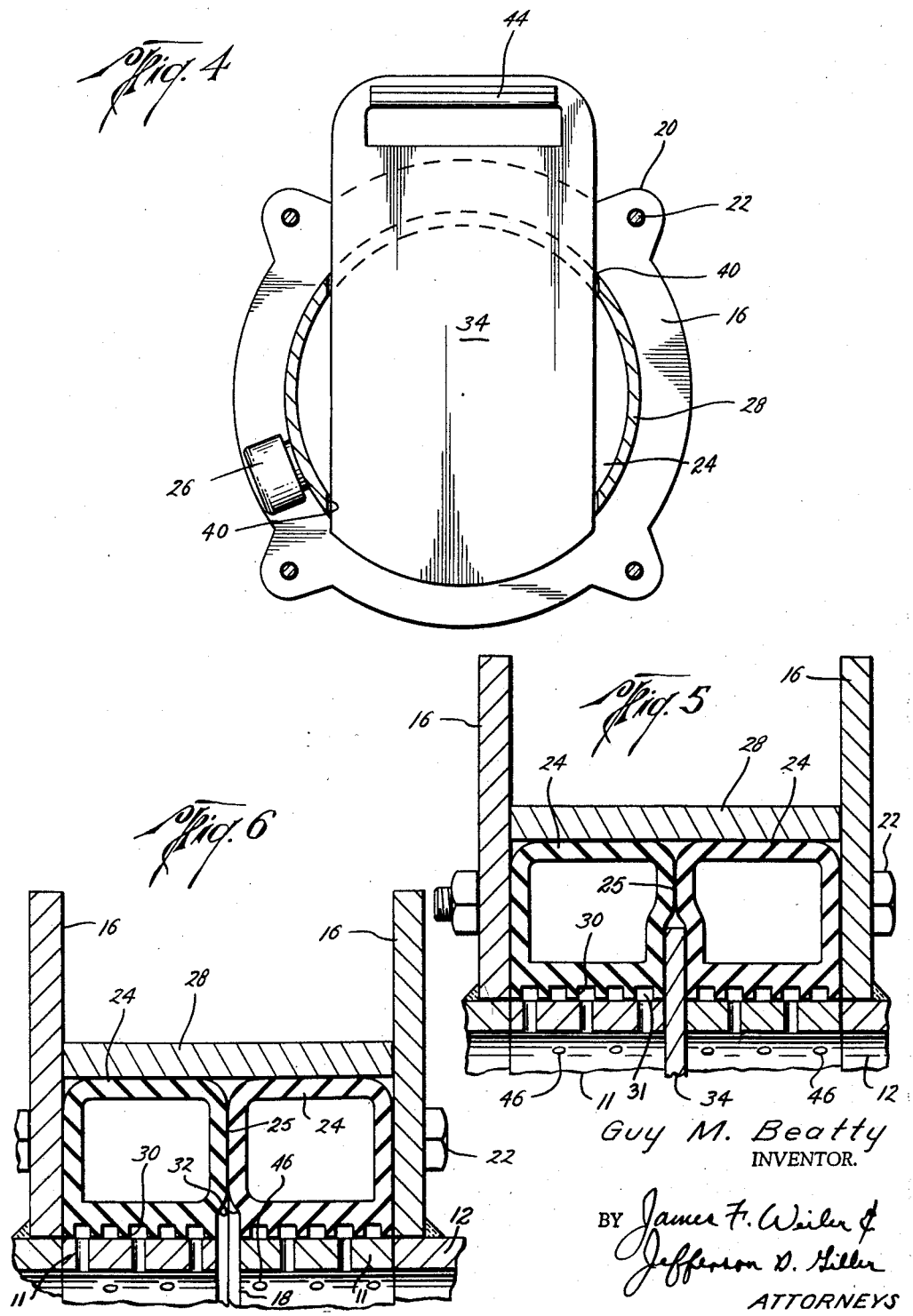

United States Patent Office 2,914,294
Patented Nov. 24, 1959

2,914,294

GATE VALVE

Guy M. Beatty, Bakersfield, Calif., assignor to Chiksan Company, Brea, Calif., a corporation of California Application May 3, 1957, Serial No. 656,834

9 Claims. (Cl. 251—172)

The present invetnion relates to valves and, more particularly, relates to gate valves for controlling fluid flow in pipes, conduits and the like.

The present invention is particularly suited to provide a convenient, readily accessible and quickly operable means for cutting off the flow of fluid in pipe lines, for example, mud in the suction line leading from a mud tank to a mud pump used in the oil fields, so that the flow of mud to the pump can be cut off when it is necessary to make repairs to the pump. The invention is adaptable to a wide variety of uses and conditions making it desirable to have a valve which may easily and readily be used to provide dependable, positive control of flow of fluid in pipes, flow lines, conduits or the like.

There has been a need for an efficiently reliable and inexpensive gate valve of simplified construction which permits of a full diameter opening of the pipe and provides a means by which flow in the pipe can be quickly and easily shut off when such becomes necessary. The present invention is directed to such a valve which is inexpensive to construct, operate and maintain and which may be easily and readily installed and quickly used to dependably cut off the flow in a pipe when desirable.

Accordingly, it is an object of the invention to provide an improved gate valve of simplified construction which may readily and easily be installed in a line and which, when open, provides a full opening through the valve.

Another object of the present invention is the provision of a gate valve including a gate member which may quickly and readily be inserted into or removed from the valve for cutting off or permitting flow in the line, respectively.

Another object of this invention is the provision of a gate-type valve in which sediment, extraneous matter and the like do not prevent or otherwise interfere with complete closing of the valve.

Another object of the present invention is the provision of an improved gate valve which is economical to install, operate and maintain, which is of simplified construction and which may easily and effectively be operated to reliably cut off the flow of fluid in a line to which the gate valve is attached.

Another object of this invention is to provide a gate valve which utilizes expansible seats having provision for receiving in sealing relation a plate-like gate valve member inserted across the line for cutting off flow.

Another object of the invention is to provide a valve construction wherein leakage is prevented by a sealing member which is actuated by the combined action of a pressurized fluid outside the sealing member and a separate pressurized fluid inside the sealing member.

Other objects, features and advantages of the invention will be apparent from the following description of one example of the invention, given for the purpose of disclosure, and the accompanying drawings, wherein like character references designate like parts throughout the several views, in which:

Figure 1 is a side elevation illustrating a gate valve according to the invention connected to a pipe line, Figure 2 is a sectional view taken along the line 2—2 of Figure 1, Figure 3 is a cross-sectional view taken along the line 3—3 of Figure 1, Figure 4 is a cross-sectional view taken along the line 4—4 of Figure 1, Figure 5 is an enlarged, fragmentary view of the sealing rings gripping the gate member when the valve is in closed position, and Figure 6 is a view similar to Figure 5 illustrating the sealing rings in sealing position with the gate member removed.

Referring now to the drawings, and particularly to Figure 1, the gate valve 10 of the invention is illustrated as having a body comprising two pipe sections 12 each of which is welded or may be otherwise secured at one end thereof to a pipe 14.

As best seen in Figures 2, 3 and 4, an annular flange 16 is welded or otherwise secured to each of the pipe sections 12 at the adjacent ends thereof. Projections 20 spaced circumferentially about the flanges 16 cooperate with bolts and nuts, generally referred to by the reference numeral 22, to rigidly interconnect the flanges 16. It will be understood, however, that any suitable or desired means may be utilized to interconnect the flanges 16 in assembled relationship. A pair of short tubes 11 are interposed between the spaced apart ends of the pipe sections 12 in coaxial relation therewith. The tubes 11 correspond in both wall thickness and diameter to the pipe section 12 so that in effect, each short tube 11 constitutes a continuation of one of the pipe sections 12 and cooperates therewith to define a portion of the pipe 14. If desired, of course, these elements may be integral.

Disposed between the rings 16 are a pair of sealing rings 24 which are resiliently deformable and which fit snugly against the outer surfaces of the opposed tubes 11. Preferably, these packing rings 24 are hollow and each is provided with a flange 26 (Fig. 3) by which fluid under pressure may be supplied to the interior of the ring for the purpose of expanding it into sealing position. If desired, air, grease or other liquid or semi-liquid material may be forced under pressure into the rings 24 to normally bring the rings together into sealing relationship as best seen in Figure 6.

A retainer sleeve 28 is disposed between the flanges 16 and serves to space these flanges apart and provide a circumferential retainer for the sealing rings 24. Thus, the rings 16 and the sleeve 28 form a housing and together with the outer surfaces of the tubes 11 confine the sealing rings 24 so that when they are pressurized, an effective seal or union is provided.

If desired, as best seen in Figures 5 and 6, a series of annular beads or ribs 30 may be provided on the inner circumference of each sealing ring 24 to engage the outer surface 27 of the associated tube 11. These may be omitted, however, if desired. It will be understood that any preferred configuration may be provided on the opposed sealing suraces 25 (Figs. 5 and 6) of the seal rings 24 to provide the desired sealing qualities although these surfaces may be left smooth if desired. Being resiliently flexible, these surfaces 25 are capable of adapting themselves to irregularities on the surfaces with which they are in engagement, and, consequently, of establishing an efficient fluid-tight sealing relationship therewith, even when sediment or other accumulation is present between the engaging surfaces.

The ring-type packing seals 24 may be of any desired shape or configuration, and, if desired may be a single seal with means for receiving the gate valve member 34, later described. They should be capable of having pressure applied interiorly thereof to assist in providing the sealing action. They may be formed of any suitable material, for example, rubber, neoprene, resilient plastics and, preferably, should be formed of a material which is not affected by the material flowing through the pipes 14 and valve 10.

As best seen in Figures 5 and 6, the packing rings 24 are shaped to provide therebetween a space 32 in radial alignment with the spaced apart ends 18 of the tubes 11 for the purpose of assisting the insertion of the gate valve member 34 between the tubes 11 and between the seal rings 24. Thus, when the gate valve member 34 is inserted into position, a seal is effected against both sides of the gate valve member 34 thereby establishing a reliable, leak-proof seal to prevent leakage between the member 34 and either sealing ring 24.

As previously mentioned, the sleeve 28 disposed between the axially-spaced flanges 16 advantageously performs a number of functions. The sleeve 28 serves to confine the packing rings 24 and also serves to act as an axial spacing member for the flanges 16 when they are rigidly interconnected by the nuts and bolts 22. In addition, openings 38 are provided in the sleeve 28 to receive the valves 26, as best seen in Figure 3, and opposed sides of the sleeve 28 are slotted, at 40, as best seen in Figure 4, to permit the gate valve member 34 to extend through the sleeve 28. Thus, any sediment or other foreign material that might become lodged between the sealing rings 24 is pushed out of the way and does not prevent complete closing of the valve. If desired, of course, a seat could be provided in place of one of the slots; however, the slots are preferred as this avoids trapping sediment or debris between the gate valve member 34 and such a seat in a manner that would prevent complete closing. Thus, the gate valve member 34 is guided into sealing position by means of the slots 40, tube ends 18, and the opposed walls 25 of the packing rings 24. To assist in removing the gate valve member 34, a handle 44 may be provided adjacent the exposed end, although this may be omitted if desired.

The gate valve member 34 is substantially a plate-like member and may be formed of any material which will withstand the pressures and conditions of use imposed.

The tubes 11 are perforated, as at 46, so that fluid pressure within the flow line is brought to bear against the ring seals 24 to increase the pressure exerted by the opposed sealing surfaces 25 and thereby to assist in effecting a seal. When ribs or beads 30 are provided on the inner circumferences of the seal rings 24, the perforations 46 preferably should admit fluid pressure into the annular spaces 31 between the ribs 30 so that the pressure will be equally distributed throughout substantially the entire inner circumferences of the seal rings 24.

In assembling a gate valve of the present invention, the spaced flanges 16 may be secured adjacent the ends of the pipe sections 12, as by welding or other means, the ring seals 24 slipped over the tubes 11 and placed adjacent the ends of the pipe sections 12, and the sleeve member 28 disposed about the ring seals 24 with the valves 26 extending through the openings 38 provided for that purpose. The two spaced flanges 16 may then be tightened against the ends of the sleeve 28 by the bolts and nuts 22 and the seal rings 24 then pressurized by means of a suitable fluid, such as air, liquids, greases and the like. A union is thus provided which effectively secures the pipe sections 12 together and prevents leakage of fluid at the union, all as previously described.

In the event it is desired to cut off the flow of fluid in the flow line 14, the gate valve member 34 is inserted in the slots 40 in the retainer sleeve 28 and pressed down into the position illustrated in Figure 4 thereby effectively shutting off flow in the pipe sections 12. When it is desired to permit flow through the pipe 12 to resume, the gate valve 34 is merely pulled out of the slots 40. If desired, pressure is released from the seal rings 24 before moving the valve member 34, although, in many cases this will not be necessary.

The gate valve many advantageously be used as a choke, if desired. Thus, the gate valve member 34 may be inserted through one slot 40 and only part way across the bore of the tubes 11 to provide the desired choke opening in the flow line 14.

It will be understood, of course, that the union and gate valve may be secured directly to the ends of opposed pipes in one or more places in a pipe line for a variety of uses, or it may be made up into a unit or section of pipe which is adapted to be welded, threaded or otherwise secured in a line of pipe.

The present invention may be used for a wide variety of purposes where it is desirable to provide a gate valve which may quickly and easily be operated to stop flow of materials in a line, for example gases, liquids and the like, and the components thereof may be formed of any desired materials which are suitable for and withstand the conditions of use.

The present invention therefore is well suited and adapted to attain the ends and objects and has the advantages and features mentioned as well as others inherent therein. While only a single embodiment of the invention has been shown and described for the purpose of disclosure, numerous changes in details and arrangement of parts will readily suggest themselves to those skilled in the art, and are encompassed within the spirit of the invention and the scope of the appended claims.

What is claimed is:

1. A valve for use in a pressurized fluid conducting pipe line comprising two tubes having spaced apart ends, an expansible ring surrounding the end of each tube, said rings having hollow interiors and having sealing surfaces in opposed relation with each other, enclosing means for confining the expansible rings on said spaced apart ends of the tubes, a plate-like valve member adapted to be inserted into th space between the ends of said tubes and between the sealing surfaces of said expansible rings, a quantity of pressurized material sealed within the hollow interior of each expansible ring for forcing the sealing surface thereof to tightly seal against the plate-like valve member, and means for communicating pressurized fluid from within said tubes into said enclosing means for assisting said pressurized material to force said surfaces to tightly seal against said plate-like valve member.

2. A gate valve comprising: two adjacent tubular members having adjacent ends thereof spaced apart, a housing surrounding said spaced ends, resilient sealing means confined within the housing and surrounding the outer circumferential surfaces of the spaced ends, said resilient sealing means having a sealed pressure chamber therein and said sealing means being provided with abutting valve sealing surfaces parallel to the plane of the space between said spaced ends, a valve member insertable into the housing and the space between said spaced ends and adapted to sealingly engage said valve sealing surfaces for stopping flow between said two tubular members, means connected to said chamber for introducing fluid under pressure thereto, and means for communicating fluid pressure from within one of said tubes to a portion of said sealing means other than said sealing surfaces thereof for assisting in sealing said sealing surfaces against said valve member.

3. A gate valve comprising: a body provided with a flow passage therethrough and adapted to be connected into a pipe line, said body being transversely slotted, a housing enclosing the slotted portion of the body, said housing being provided with an opening aligned with the slot in the body, a hollow expansible sealing member having pressurized fluid sealed therein, said sealing member surrounding the body adjacent the slotted portion thereof and being confined within the housing, a valve element insertable into the housing opening and into the slot in the body for closing the flow passage through the body, said valve element being adapted to sealingly engage the expansible sealing member, passageways in said body for communicating pressure within the body against the confined expansible sealing member to assist in sealing said valve element, and means connected to said expansible sealing member for varying the pressure of the fluid sealed therein.

4. A gate valve comprising: a housing having therethrough a flow passage for fluid under pressure, two spaced apart axially aligned perforated tubes encircling the flow passage, a pair of sealing rings confined in the housing, each of said sealing rings surrounding one of said axially spaced tubes and having a sealed chamber therein, means on said housing defining an opening aligned with the adjacent ends of said tubes, a valve member adapted for insertion into the housing opening between the sealing rings to close said flow passage, and means for injecting pressurized fluid into said chambers to urge the sealing rings into engagement with the valve member, the perforations of said tubes admitting fluid under pressure from the flow passage to increase the tightness of the engagement between the sealing rings and said valve member.

5. Apparatus for blocking flow of a fluid in a pipe line comprising two sections of pipe, said sections having axially aligned ends which are spaced apart, a hollow resilient sealing member surrounding the end of each pipe section, the sealing members having sealing surfaces which engage each other about the spaced apart ends of the pipe sections, a rigid housing connected to said pipe sections for confining the resilient sealing members in sealing engagement with each other, a plate extending transversely of the housing and between the spaced apart ends of the pipe sections and between the sealing surfaces of the sealing members for blocking flow in the pipe line, a first means for urging said sealing surfaces together against said blocking plate comprising means for conducting fluid from the blocked pipe line into said rigid housing, and a second means for urging said sealing surfaces together comprising means for forcing a pressurized material into each of said hollow resilient sealing members.

6. Apparatus for blocking flow of a fluid in a pipe line comprising: two pipe portions having ends spaced from and axially aligned with each other; a flange mounted on each pipe portion and spaced from said end of the respective pipe portion; two resilient sealing rings each having an inner circumferential surface surrounding one of said pipe portions between said end thereof and the associated flange, the two sealing rings confined between the flanges to sealingly engage each other; a sleeve circumferentially surrounding the sealing rings for confining each of the sealing rings against the respective pipe portion; means for rigidly connecting the sleeve to said flanges; a flow blocking plate extending across the pipe line between said pipe portion ends and between said sealing rings; means for injecting a pressurized material into each sealing ring for urging the respective sealing ring to sealingly engage the flow blocking plate, the pipe portion on the upstream side of said blocking plate having passageways therein for imposing upstream fluid pressure upon said inner circumferential surface of the sealing ring on the upstream side of said plate, the pipe portion on the downstream side of said blocking plate having passageways therein for imposing downstream fluid pressure upon said inner circumferential surface of the sealing ring on the downstream side of said plate, said fluid pressures further urging said sealing rings to sealingly engage said flow blocking plate.

7. Apparatus for blocking flow of pressurized fluid in a pipe line comprising: a first and a second pipe portion having ends spaced apart from each other, a flow blocking plate having dimensions substantially larger than the outside dimension of the pipe portions, means for inserting the flow blocking plate into the space between the ends of said pipe portions for blocking flow therethrough, a first hollow sealing member surrounding said first pipe portion and having a sealing surface in contact with one side of said blocking plate, a second hollow sealing member surrounding said second pipe portion and having a sealing surface in contact with the other side of said blocking plate, a housing connected to said pipe portions and enclosing said sealing members for confining the same in pressure engagement with opposite sides of said plate, a first means connected to said first sealing member for introducing pressurized material into said first hollow sealing member, a second means connected to said second sealing member for introducing pressurized material into said second hollow sealing member, said first pipe portion being provided with a first passageway for conducting pressurized fluid from said first pipe portion into said housing for urging the sealing surface of said first sealing member into engagement with said blocking plate, said second pipe portion being provided with a second passageway for conducting pressurized fluid from said second pipe portion into said housing for urging the sealing surface of said second sealing member into engagement with said blocking plate.

8. In a valve the combination of a pair of spaced axially aligned pipe sections, a flange connected to each pipe section, a perforated tube aligned with one of said pipe sections between said flanges and having an inside diameter substantially equal to that of said one pipe section, a hollow resilient sealing ring having pressurized fluid therein and having lateral sealing surfaces thereon, said sealing ring surrounding said perforated tube, a circumferential sleeve surrounding said resilient sealing ring, means for interconnecting the flanges on the pipe ends with one of the lateral sealing surfaces of said sealing ring in sealing contact with one of said flanges, a plate for blocking flow of fluid between the connected pipe ends, said plate extending through the sleeve and contacting the other lateral sealing surface of said sealing ring, said lateral sealing surfaces of said sealing ring being pressed into fluid-sealing engagement with said plate and with said one flange by the pressure of the fluid within the sealing ring augmented by the pressure of the blocked fluid within the pipe section on the upstream side of the plate.

9. In a valve the combination of a pair of spaced axially aligned tubular members, a flange connected to each tubular member, a pair of aligned perforated tubes between said flanges, said tubes having an inside diameter substantially equal to the inside diameter of said tubular members, a pair of hollow resilient sealing rings, each sealing ring surrounding a respective perforated tube and having pressurized fluid sealed therein and each having two lateral sealing surfaces thereon, a circumferential sleeve surrounding said sealing rings, said sleeve having a transverse slot therein, means interconnecting the flanges on the pipe ends with one sealing surface of each sealing ring in sealing engagement with the respective flange and with adjacent sealing surfaces of the two sealing rings in sealing engagement with each other, a plate for blocking flow of fluid through said tubular members, said plate extending through said slot and between said adjacent sealing surfaces, and means for effecting a tight seal between said sealing surfaces and the plate by the pressure of the blocked fluid in said tubular members on opposite sides of the plate acting on the inner circumferences of the sealing rings through the perforations in the respective tubes and by the pressure exerted by said pressurized fluid in the interior of the sealing rings.

(References on following page)

References Cited in the file of this patent

UNITED STATES PATENTS

| | | |
|---|---|---|
| 333,492 | Watson | Dec. 29, 1885 |
| 1,054,150 | Thorsby | Feb. 25, 1913 |
| 1,476,344 | McGee | Dec. 4, 1923 |
| 2,732,170 | Shand | Jan. 24, 1956 |
| 2,786,642 | Comb | Mar. 26, 1957 |

FOREIGN PATENTS

| | | |
|---|---|---|
| 868,864 | France | Oct. 20, 1941 |
| 1,089,995 | France | Oct. 13, 1954 |
| 1,114,153 | France | Dec. 12, 1955 |